(12) United States Patent
Gomes De Lima et al.

(10) Patent No.: US 6,984,912 B2
(45) Date of Patent: Jan. 10, 2006

(54) DYNAMOELECTRICAL MACHINE WITH WEDGED-IN WINDING BARS

(75) Inventors: Paulo Gomes De Lima, Wettingen (CH); Ueli Neff, Appenzell (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/847,472

(22) Filed: May 18, 2004

(65) Prior Publication Data

US 2004/0263017 A1    Dec. 30, 2004

Related U.S. Application Data

(63) Continuation of application No. PCT/CH02/00626, filed on Nov. 20, 2002.

(30) Foreign Application Priority Data

Nov. 23, 2001    (DE) ................. 101 57 582

(51) Int. Cl.
*H02K 3/38*    (2006.01)
(52) U.S. Cl. .................... 310/214; 310/215
(58) Field of Classification Search ......... 310/214–218
See application file for complete search history.

(56) References Cited

U.S. PATENT DOCUMENTS

| 3,949,255 A | 4/1976 | Brown et al. |
| 3,976,901 A | 8/1976 | Liptak et al. |
| 4,369,389 A | 1/1983 | Lambrecht |
| 4,710,663 A | 12/1987 | Reid |
| 5,053,663 A * | 10/1991 | Boer et al. ............ 310/91 |
| 6,252,328 B1 | 6/2001 | Brem et al. |

FOREIGN PATENT DOCUMENTS

| DE | 1 463 872 | 4/1969 |
| DE | 1918 859 | 10/1970 |
| EP | 60091835 | 5/1985 |
| NL | 86560 | 9/1957 |
| WO | 03/044926 A3 | 5/2003 |

OTHER PUBLICATIONS

Search Report from PCT/CH 02/00626 (Jun. 26, 2003).
Search Report from DE 101 57 582.3 (Aug. 9, 2002).
IPER from PCT/CH 02/00626 (Jul. 22, 2003).

* cited by examiner

*Primary Examiner*—Thanh Lam
(74) *Attorney, Agent, or Firm*—Cermak & Kenealy, LLP; Adam J. Cermak

(57) ABSTRACT

A dynamoelectrical machine (20) has winding bars (13) which are inserted into slots provided for this purpose in the dynamoelectrical machine (20), with the slots each being closed by cover wedges (23), and with corrugated springs (16) being provided between the cover wedges (23) and the winding bars (13) located underneath them, which are prestressed by means of opposing wedges (21), which are arranged between the cover wedges (23) and the winding bars (13) located underneath them. In a machine such as this, fast and simple wedging is made possible in that the opposing wedges (21) are arranged between the cover wedges (23) and the corrugated springs (16), and in that fixed-position adjusting elements (22) are provided, by means of which it is possible to vary the distance between the cover wedges (23) and the opposing wedges (21).

10 Claims, 2 Drawing Sheets

DYNAMOELECTRICAL MACHINE WITH WEDGED-IN WINDING BARS

This application is a Continuation of and claims priority under 35 U.S.C. § 120 to International application number PCT/CH02/00626, filed 20 Nov. 2002, and claims priority under 35 U.S.C. § 119 to German application number 101 57 582.3, filed 23 Nov. 2001, the entireties of which are incorporated by reference herein.

BACKGROUND OF THE INVENTION

1. Field of the Invention

The present invention relates to the engineering field of dynamoelectrical machines. It relates in particular to a dynamoelectrical machine.

A machine such as this is known, for example, from U.S. Pat. No. 3,949,255.

2. Brief Description of the Related Art

A large number of solutions as to how the winding bars of a generator winding can be wedged in place in the slots provided for this purpose in a stator are known from the prior art. Examples of wedge arrangements such as these can be found in U.S. Pat. No. 3,976,901 or U.S. Pat. No. 4,369,389.

Wedge arrangements with intermediate corrugated springs, such as those disclosed in the initially cited U.S. Pat. No. 3,949,255 and as illustrated in the form of a detail in FIGS. 1 and 2, have been proven in particular. As is shown in FIGS. 1 and 2, the known dynamoelectrical machines 10 have a double layer of winding bars 13, which are arranged in slots 12 (which are open at the top) in the stator 11. The slots 12 are closed by means of a system of inclined or parallel wedges, which system comprises an (upper) cover wedge 17 and a (lower) opposing wedge 15. Corrugated springs 16 composed of fiber-reinforced epoxy resin are inserted as elastic spacers between the cover wedge 17 and the opposing wedge 15. Different numbers of filling strips 14 are provided under each opposing wedge 15, in order to compensate for fluctuations in the dimensions of the winding bars.

The cover wedges 17 are provided on the sides with slits 19, which are arranged such that, when the cover wedge is inserted, they are aligned with cooling slits 18 provided in the stator laminated core, thus allowing cooling air to enter the cooling slits 18. The use of the corrugated springs 16 results in an "automatically readjusting" system. There is thus generally no need for wedging in place once again after a certain period of operation. A further advantage of this wedging system is that the cover wedge 17 does not move relative to the side walls of the slot 12 when being wedged in place.

A disadvantage of the wedging system shown in FIGS. 1 and 2 is, however, the considerable time penalty involved in production of the complete system.

SUMMARY OF THE INVENTION

The object of the invention is thus to provide a system for wedging in place the winding bars in a dynamoelectrical machine, which avoids the disadvantages of known systems, and which is distinguished in particular by a considerable reduction in the time required for production of the system.

The essence of the invention is to arrange the opposing wedges between the cover wedges and the corrugated springs, and to provide fixed-position adjusting elements at specific points, by means of which it is possible to vary the distance between the cover wedges and the opposing wedges. Instead of the necessity to prestress the corrugated springs by means of time-consuming, corresponding insertion of the wedges, the wedges in the new system are first of all inserted without any prestressing, or with only a small amount of prestressing, of the corrugated springs, and the necessary prestressing is then produced simply by operation of the adjusting elements and by means of the change in the wedge separation associated with this.

According to one preferred refinement of the invention, the adjusting elements can rotate about a fixed-position rotation axis and the distance between the cover wedges and the opposing wedges can be varied by rotation of the adjusting elements about the fixed-position rotation axis. A type of adjustment such as this can be achieved and also carried out particularly easily.

In particular, the adjusting elements are mounted in the cover wedges such that they can rotate, and are supported on the opposing wedges by means of a surface facing away from the cover wedges, with the adjusting elements preferably each having a bolt part by means of which they are mounted in a hole in the cover wedge such that they can rotate.

A first preferred development of the refinement is distinguished in that the bolt part of the adjusting element has an external thread, and in that the hole in the cover wedge is in the form of a threaded hole matched to the external thread. Thus, depending on the thread pitch, rotation of the adjusting element results in a greater or lesser change to the distance between the wedges.

A second preferred development of the refinement is characterized in that the adjusting elements each have a disk part, which is located between the cover wedge and the opposing wedge and is coaxial with respect to the bolt part, and in that the upper face and lower face of the disk part as well as the lower face of the cover wedge and the upper face of the opposing wedge are designed in the area of the disk part such that the distance between the cover wedge and the opposing wedge varies when the disk part is rotated. This allows particular adjustment capabilities to be achieved, in which the relationship between the rotation angle and the change in distance is not linear, as will be the case with a thread.

In particular, such non-linear adjustment is achieved by providing cutouts, which match one another, and projections which project out of the surface and engage in one another and are disengaged from one another depending on the rotation position of the disk part in the opposite faces of the disk part and of the two wedges.

The adjusting elements can be operated particularly easily if, as is claimed in another refinement to the invention, the hole in the cover wedge is in the form of a through-hole, and if a recess into which a tool for operation of the adjusting element can be inserted is provided on the upper face of the bolt part.

BRIEF DESCRIPTION OF THE DRAWINGS

The invention will be explained in more detail in the following text with reference to exemplary embodiments and in conjunction with the drawing, in which.

DETAILED DESCRIPTION OF THE PREFERRED EMBODIMENTS

Figure 1:
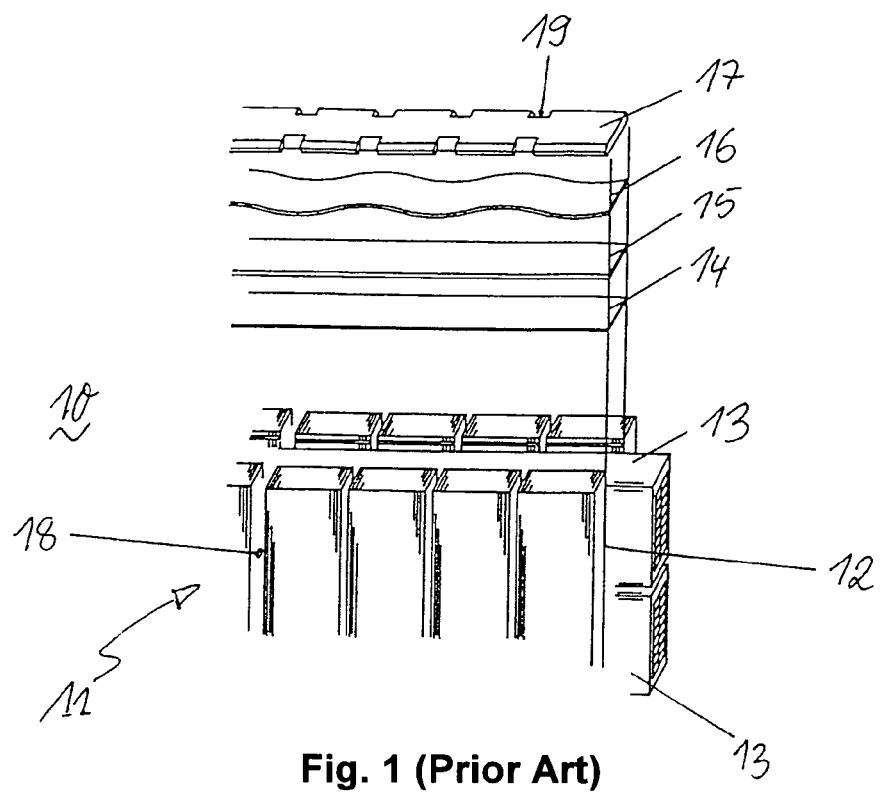
FIG. 1 shows an exploded illustration of the parts of a wedging system in a dynamoelectrical machine according to the prior art.
Figure 2:
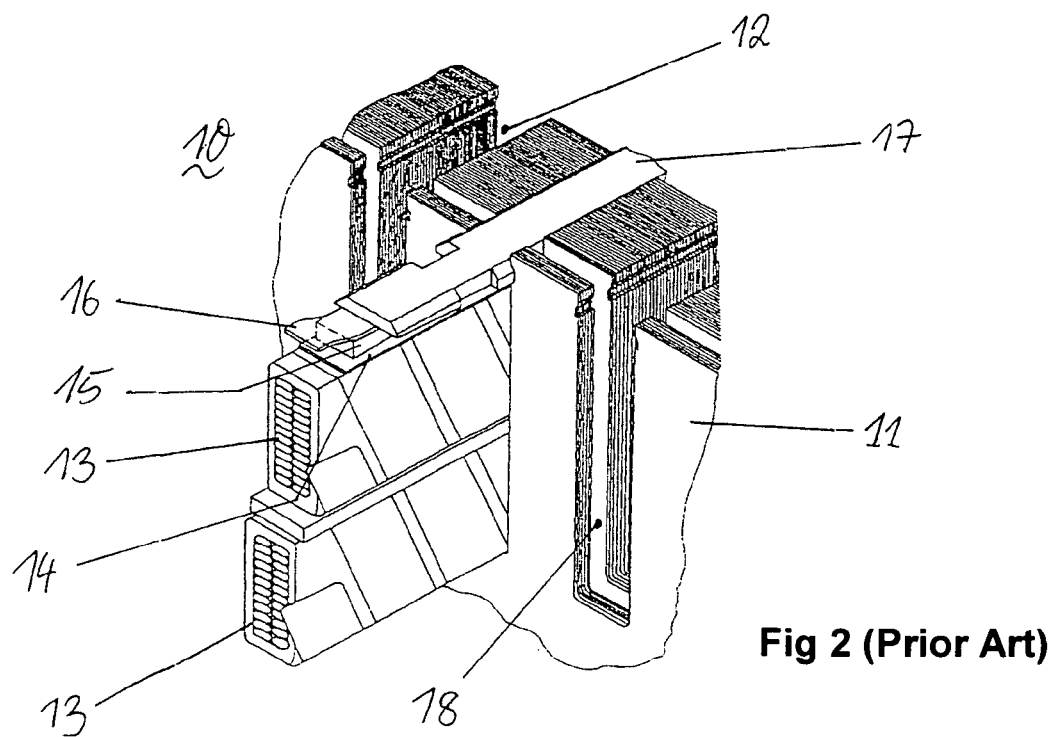
FIG. 2 shows a detail of the completely wedged machine as shown in FIG. 1.
Figure 3:
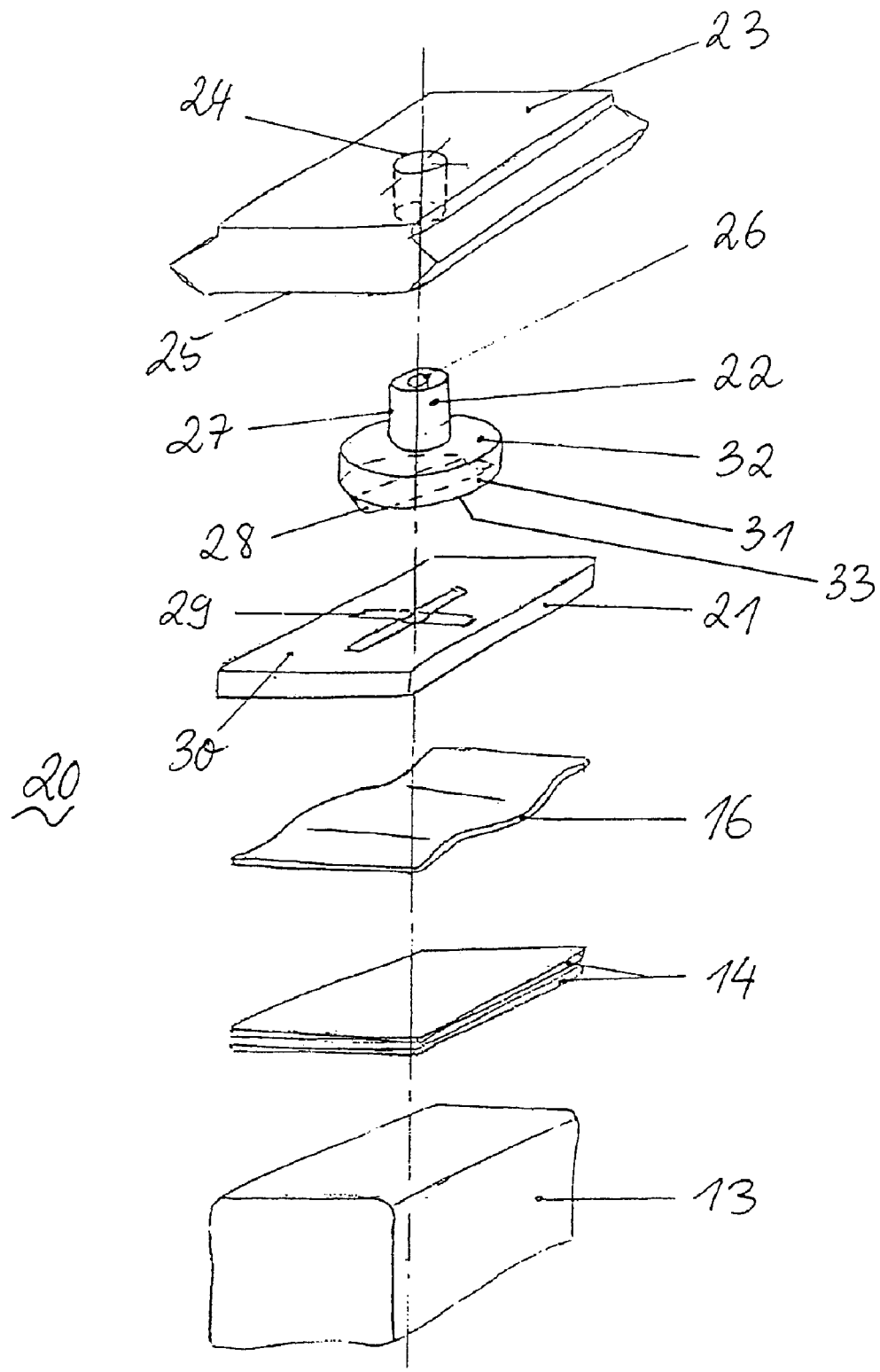
FIG. 3 shows an exploded illustration of the parts of a wedging system according to one preferred exemplary embodiment of the invention.

FIG. 3 shows an exploded illustration of the parts of a wedging system for a dynamoelectrical machine 20 according to one preferred exemplary embodiment of the invention. The slots (which are not shown) with the winding bars 13 located in them are closed by a system of parallel wedges, which comprises an (upper) cover wedge 23 and an opposing wedge 21 located underneath it. The two wedges 23 and 21 follow one another directly. Corrugated springs 16 composed of fiber-reinforced epoxy resin are arranged underneath the opposing wedges 21, and filling strips 14 are arranged underneath the corrugated springs 16. The function of the corrugated springs 16 and of the filling strips 14 is the same as in the case of the wedging system from the prior art.

In contrast to the already known wedging system, local adjusting elements 22 are now provided, according to the invention, at predetermined points between the wedges 23 and 21, by means of which it is possible to vary the distance between the wedges 23, 21 quickly and easily. In this way, this desired prestressing of the corrugated springs 16 can be set by adjustment of the adjusting elements 22 without any need for tedious movement of the wedges 23, 21 with respect to one another.

In the exemplary embodiment illustrated in FIG. 3, the single adjusting element 22 is in the form of an element which is arranged in a fixed position and can rotate about a (vertical) rotation axis. The adjusting element 22 is composed of an (upper) cylindrical bolt part 27 and a (lower) circular disk part 31. The two parts 27, 31 are coaxial with respect to the rotation axis. The adjusting element 22 is mounted in a hole 24 in the cover wedge 23 such that it can rotate by means of the bolt part 27. Together with the disk part 31, the adjusting element 22 is located between the two wedges 23 and 21, and is supported in particular by the lower face 33 of the disk part 31 on the upper face of the opposing wedge 21. The adjusting element 22 is preferably integral, and is produced from a non-magnetic material. The adjusting element 22 is adjusted by rotation through a specific angle about the rotation axis.

The rotation of the adjustment element 22 is associated with a change in the distance between the two wedges 23 and 21. In this case, there is a linear relationship between the rotation angle and the separation when, according to one preferred refinement of the invention, the bolt part 27 has an external thread, by means of which the adjusting element 22 can be screwed into the hole 24, which is in the form of a threaded hole. When, during rotation, the adjusting element 22 is then screwed out of the threaded hole 24, the distance between the two wedges 23 and 21 is increased, and the corrugated spring 16 which is located under the opposing wedge 21 is compressed to a greater extent, and is thus prestressed to a greater extent. The adjusting element 22 is in this case expediently adjusted by means of a tool, which can be inserted from above through the hole 24, such that they rotate together, into a recess 26 which is provided for this purpose in the bolt part 27—for example in the form of an internal hexagonal recess or the like.

Other types of adjusting mechanisms can be provided for the adjusting element 22 by specially shaping the opposite faces 25, 32 and 33, 30 of the disk part 31 and of the wedges 23, 21. In the exemplary embodiment that is illustrated in FIG. 3, two elongated cutouts 29, which are arranged in a cruciform shape and have a semicircular cross-sectional profile, are provided on the upper face 30 of the opposing wedge 21. A corresponding half-cylindrical projection 28 projects out of the surface on the lower face 33 of the disk part 31. In four rotation positions of the adjusting element 22 (which are each separated from one another by 90°), in which the projection 28 engages in one of the cutouts 29, the lower face 33 of the disk part 31 rests flat on the upper face 30 of the opposing wedge 21, and this results in the minimum distance between the two wedges 23, 21. If the adjusting element 22 is rotated away from one of these positions, the projection 28 and the cutouts 29 disengage from one another, and the distance between the two wedges 23, 21 is increased by the height of the projection 28. This switch-like, non-linear adjusting characteristic of the adjusting element 22 allows the prestressing of the corrugated spring 16 to be increased very quickly and efficiently.

Comparable surface shapes may, of course, also be provided on the upper face 32 of the disk part 31 and on the lower face 25 of the cover wedge 23. In the same way, other shapes, for example oblique shapes, of the surface are feasible for producing specific adjusting characteristics. The critical feature in this is that the necessary prestressing of the corrugated springs 16 can be achieved by the adjustment process. It is also possible within the scope of the invention to provide one or more adjusting element or elements for each cover wedge 23.

LIST OF REFERENCE SYMBOLS

| | |
|---|---|
| 10, 20 | Dynamoelectrical machine |
| 11 | Stator (laminated core) |
| 12 | Slot |
| 13 | Winding bar |
| 14 | Filling strips |
| 15, 21 | Opposing wedge |
| 16 | Corrugated spring |
| 17, 23 | Cover wedge |
| 18 | Cooling slit |
| 19 | Slit |
| 22 | Adjusting element |
| 24 | Hole (threaded hole) |
| 25 | Lower face (cover wedge) |
| 26 | Recess |
| 27 | Bolt part |
| 28 | Projection |
| 29 | Cutout |
| 30 | Upper face (opposing wedge) |
| 31 | Disk part |
| 32 | Upper face (disk part) |
| 33 | Lower face (disk part) |

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A rotating dynamoelectrical machine comprising:
an axis of rotation
slots extending along said axis of rotation and being provided for receiving winding bars of a winding of said dynamoelectrical machine;
winding bars inserted into said winding bar receiving slots;

cover wedges, said winding bar receiving slots each slideably receiving and being closed by one of said cover wedges;

corrugated springs arranged between said cover wedges and said winding bars;

opposing wedges, said corrugated springs being pre-stressed by said opposing wedges, said opposing wedges being arranged between said cover wedges and said winding bars;

wherein said opposing wedges are arranged between said cover wedges and said corrugated springs; and adjusting elements being distributed along said winding bar receiving slots at predetermined and fixed positions, said adjusting elements being configured and arranged to vary the distance between said cover wedges and said opposing wedges.

2. The dynamoelectrical machine as claimed in claim 1, wherein the adjusting elements are configured and arranged to:

rotate about a fixed-position rotation axis; and vary the distance between the cover wedges and the opposing wedges by rotation of the adjusting elements about the fixed-position rotation axis.

3. The dynamoelectrical machine as claimed in claim 2, wherein the adjusting elements are rotatably mounted in the cover wedges, and the adjusting elements are supported on the opposing wedges by a surface facing away from the cover wedges.

4. The dynamoelectrical machine as claimed in claim 3, wherein the adjusting elements each have a bolt part and each cover wedge includes a hole, each adjusting element bolt part rotatably mounted in a cover wedge hole.

5. The dynamoelectrical machine as claimed in claim 4, wherein the adjusting element bolt part includes an external thread, and the cover wedge hole includes a threaded hole matched to said external thread.

6. The dynamoelectrical machine as claimed in claim 4, wherein the adjusting elements each have a disk part located between the cover wedge and the opposing wedge and coaxial with the bolt part;

wherein the disk part includes an upper face and a lower face, the cover wedge includes a lower face, and the opposing wedge includes an upper face; and wherein the upper face and lower face of the disk part, the lower face of the cover wedge, and the upper face of the opposing wedge are configured and arranged in the area of the disk part such that the distance between the cover wedge and the opposing wedge varies when the disk part is rotated.

7. The dynamoelectrical machine as claimed in claim 6, wherein opposite faces of the disk part and of the two wedges comprise cutouts which match one another and projections projecting out of a face, the cutouts and projections configured and arranged to engage one another and disengage from one another depending on the rotation position of the disk part.

8. The dynamoelectrical machine as claimed in claim 4, wherein the hole in the cover wedge comprises a through-hole, and further comprising:

a recess into which a tool for operation of the adjusting element can be inserted, said recess formed on an upper face of the bolt part.

9. The dynamoelectrical machine as claimed in claim 1, further comprising:

at least two adjusting elements for each cover wedge.

10. The dynamoelectrical machine as claimed in claim 1, wherein the adjusting elements comprise a non-magnetic material.

* * * * *